Mar. 27, 1923.
W. SEIZ.
INDUCTION MOTOR SPEED REGULATION.
FILED MAR. 3, 1921.
1,449,784.
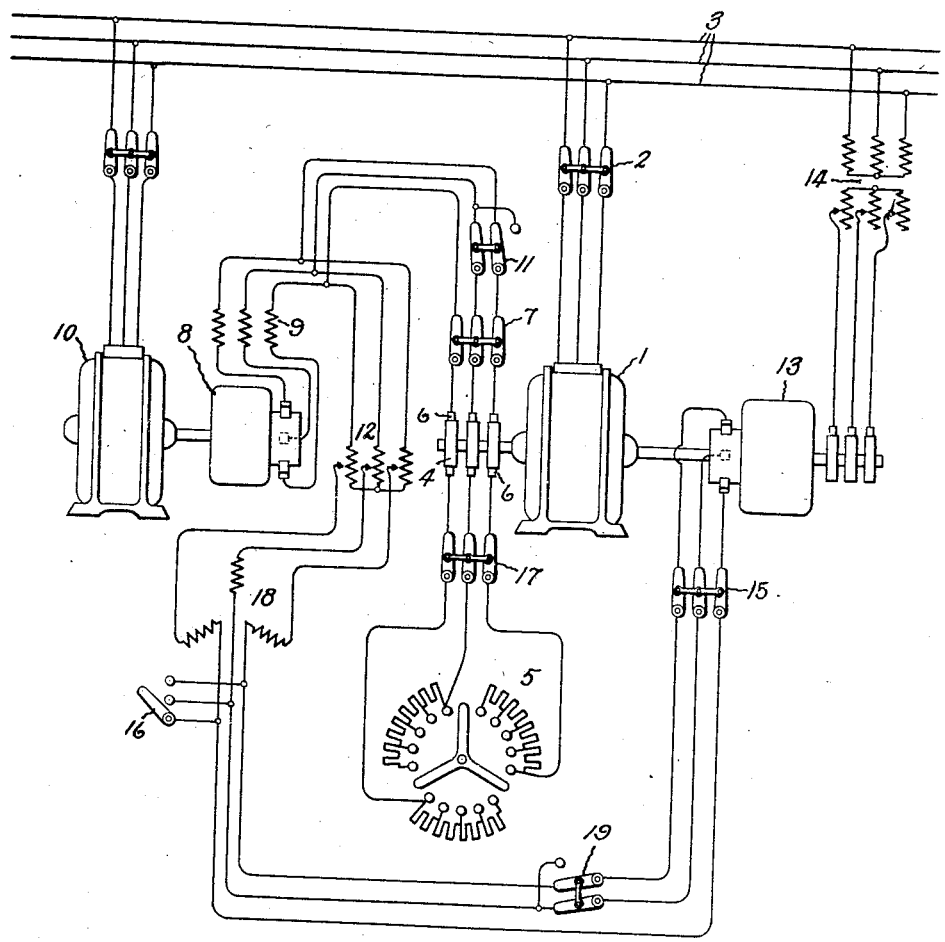
Inventor:
Walter Seiz,
by Albert G. Davis
His Attorney.

Patented Mar. 27, 1923.

1,449,784

UNITED STATES PATENT OFFICE.

WALTER SEIZ, OF BADEN, SWITZERLAND, ASSIGNOR TO GENERAL ELECTRIC COMPANY, A CORPORATION OF NEW YORK.

INDUCTION-MOTOR SPEED REGULATION.

Application filed March 3, 1921. Serial No. 449,387.

*To all whom it may concern:*

Be it known that I, WALTER SEIZ, a citizen of the German Realm, residing at Mellinger Str. 25, Baden, Switzerland, have invented certain new and useful Improvements in Induction-Motor Speed Regulation, of which the following is a specification.

This invention relates to the regulation of induction motors by means of auxiliary regulator sets such as a commutator machine connected in concatenation with the induction motor secondary.

In regulating schemes of the sort mentioned above, various methods may be utilized to bring the speed of the induction motor from standstill to over-synchronous speed. These methods are for the most part fairly complicated, since difficulty is apt to occur when the speed approaches near synchronism. It is the main object of this invention to provide a simple and easy manner for passing from under-synchronous to over-synchronous speed in a set of the sort described. The invention is particularly adapted to a system in which a frequency changer is utilized to supply part of the excitation of the commutator machine, at least during that period of operation while the machine is passing through synchronism.

The passage from under-synchronous to over-synchronous speed must be accompanied by a reversal of the phases of the commutator machine concatenated with the induction motor secondary. It has been thought that such a reversal could not be done if the motor be loaded, by a simple switching arrangement, until the speed of the main induction motor has been brought to over synchronism, as for instance by the aid of an external source. To overcome these difficulties various complex schemes have been used in the past; but with this invention it is possible to pass from under to over synchronous speeds while the machine is loaded, by a simple reversal of the phases of the commutator machine and without the aid of complicated auxiliary devices.

One of the important features of the method is the disconnecting of the commutator machine from the secondary of the induction motor after the motor has been brought nearly to synchronous speed, and then regulating the speed of the motor in a well known manner by resistance in the secondary circuit until as high a speed is thus obtained as is possible. After this is accomplished the phases of the commutator machine may be reversed and furthermore a frequency changer may be utilized to help excite this commutator machine. Then the connection of the commutator machine into concatenation with the induction motor will enable the motor to be smoothly accelerated above synchronous speed. After this is accomplished the frequency changer may be disconnected from the circuit or may be allowed to remain in as may be considered advisable.

Such manipulation as has been outlined above will prevent serious disturbances during the passage through synchronism, even while the motor is loaded. Furthermore, the manipulation of the apparatus is simple. For a better understanding of the invention, attention is directed to the accompanying drawing in which the single figure is a wiring diagram showing various elements of the speed regulating set.

Referring now more in detail to the drawing, the primary of the main induction motor 1 is connected through the switch 2 to the polyphase alternating current mains 3. The secondary in this case happens to be the rotating member of the motor and is connected to the slip rings 4 to which is connected the polyphase rheostat 5 through switch 17, by means of the brushes 6. Also connected to the collector rings 4 through the switch 7 is the commutator machine 8, having series compensating windings 9 and being driven by the motor 10 fed from the mains 3. Means is provided such as the switch 11 for reversing the phases of the commutator machine 8 with respect to the induction motor secondary. The exciting windings 18 for the machine 8 are arranged to be fed both from the secondary of the main induction motor, for example, through the autotransformers 12, and from the frequency changer or ohmic drop exciter 13, preferably carried on the shaft of the main motor 1 and supplied from the polyphase source 3 through adjustable transformers 14. Since such a combination of machines as has been outlined above is well known (see, for example, U. S. Patent No. 1,306,594, Hull, June 10, 1919), it is considered unnecessary to enter into greater detail as to their construction. The frequency changer 13 may be entirely disconnected by means of the switch 15 from the exciting windings 18, in which case a short circuiting switch 16 may be closed to complete the circuit for said exciting windings. It is to be understood also that the frequency changer may be made use of throughout the entire range of the regulation if desired and not merely for bringing the speed of the main induction motor 1 through synchronism. Under such circumstances the short circuiting switch 16 may be dispensed with entirely, but in this case it is necessary to use a switch 19 to reverse the phases of the frequency changer to change from under to over synchronous speed.

To employ the new method of operation the first step consists in bringing the speed of the main motor 1 as near to synchronism is may readily be accomplished by the use of a concatenated machine 8 and while the rheostat 5 is on open circuit. After this is accomplished, the switch 7 may be opened and the rheostat 5 gradually short circuited. At the same time the phases of the commutator machine may be reversed, for example, by means of the phase reversing switch 11, as shown, and the frequency changer may also be placed in the circuit to supply excitation for the windings 18. After the main motor 1 has its speed increased as far as possible by entirely short circuiting its secondary, commutator machine 8 is again concatenated therewith and rheostat 5 is open circuited, and by an adjustment of the excitation of windings 18 the speed of the machine may be brought smoothly to over-synchronism. If then desired the frequency changer 13 may again be disconnected by opening switch 15 and closing switch 16.

Although there is shown in the accompanying drawing a single embodiment of the invention, it is to be understood that other methods may be employed to perform the functions stated, as for example, to reverse the phases of the commutator machine 8, while it is disconnected from the secondary of the main motor 1; and it is intended to embrace in the appended claims all modifications falling fairly within the scope of the invention.

What I claim as new and desire to secure by Letters Patent of the United States, is,—

1. The method of controlling the speed of an induction motor with the aid of a concatenated commutator machine and a frequency changer, which consists in bringing the speed of the motor nearly to synchronism by the aid of the commutator machine, disconnecting said commutator machine, controlling the induction motor by variation of its secondary resistance, changing the connections of the commutator machine so as to cause a reversal of its phases with respect to the induction motor secondary, replacing the commutator machine into concatenation, and exciting said commutator machine from the frequency changer for passage through synchronism.

2. The method of controlling the speed of an induction motor with the aid of a concatenated commutator machine and a frequency changer for exciting said machine, which consists in connecting the commutator machine to the secondary of the motor, varying the excitation of said commutator machine until the motor is brought near to synchronism, disconnecting said commutator machine, controlling the speed of the induction motor by variation of its secondary resistance until the maximum speed is attained by this method, changing the connections of both the commutator machine and the frequency changer so as to cause a reversal of its phases with respect to the secondary of the induction motor, replacing the commutator machine into concatenation, and varying the excitation of said machine.

In witness whereof, I have hereunto set my hand this 9th day of February, 1921.

Dr. WALTER SEIZ.